Patented June 11, 1935

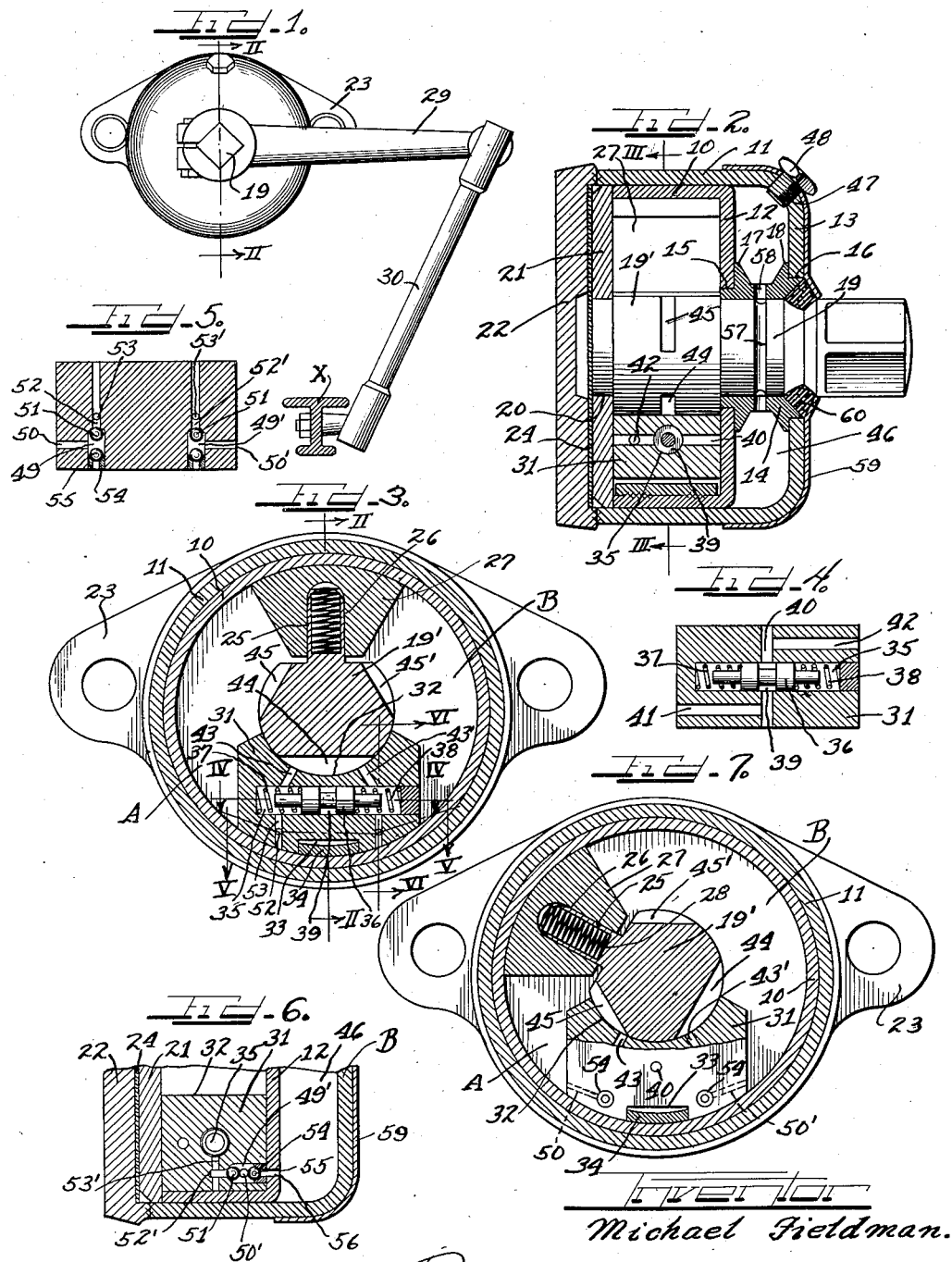

2,004,911

UNITED STATES PATENT OFFICE 2,004,911

HYDRAULIC SHOCK ABSORBER

Michael Fieldman, Chicago, Ill., assignor to Houde Engineering Corporation, Buffalo, N. Y., a corporation of New York Application June 25, 1934, Serial No. 732,231

10 Claims. (Cl. 188—89)

My invention relates to hydraulic shock absorbers adapted particularly for application to automotive vehicles to modify and check the operation of the vehicle spring.

An important object of the invention is to produce a shock absorber device which will impose comparatively little resistance to the major portion of the spring compression stroke, that is when the axle approaches the vehicle frame from its static or normal position, but will offer increased or stiffer resistance during a short final compression movement just before bottoming takes place, and which will offer a comparatively stiff resistance against rebound movement of the spring, which resistance tapers off upon the approach back to static or normal position; and with the operation of the device such as to allow for a fairly free wheel fall or spring expansion from static or normal position but imposing a comparatively stiff resistance against the follow up or fall movement of the body back to normal position relative to the axle.

A further object is to provide improved valving structure operated by fluid pressure under control of the movement and instantaneous position of the piston for accomplishment of the operations above referred to.

Another object is to produce a shock absorber involving simple parts which may be economically manufactured and readily assembled and which will function to produce the desirable operation referred to.

The various features of the invention are incorporated in the structure disclosed on the drawing, in which drawing:

Figure 1 is a front elevation of the shock absorber structure showing its application to a vehicle;

Figure 2 is a section on plane II—II of Figures 1 and 3;

Figure 3 is a section on plane III—III of Figure 2;

Figure 4 is a section on plane IV—IV of Figure 3;

Figure 5 is a section on plane V—V of Figure 3;

Figure 6 is a section on plane VI—VI of Figure 3; and

Figure 7 is a view similar to Figure 3 showing the piston structure in another operative position.

Referring to the shock absorber structure shown, it comprises inner and outer cylindrical cup shaped members or frames 10 and 11, the inner member having a press fit in the outer end of the outer member. The bottom walls 12 and 13 respectively of the members are held in spaced relation by the bearing element 14. This bearing element extends into the openings 15 and 16 in the walls 12 and 13 respectively and has the flanges 17 and 18 against which the respective walls seat.

The bearing element 14 journals the piston shaft 19 at its outer end, the shaft extending through and beyond the opening 16 in the wall 13 of the member 11. The shaft extends axially through the cup frame 10 and at its inner end is journalled in the opening 20 in the disc 21 which forms a closure for the outer end of the cup frame 10 to define with this cup frame a space for containing hydraulic fluid.

The edge of the outer frame member 11 engages against a base plate 22 having apertured ears 23 for application to a support as for example the chassis of an automotive vehicle. The frame 11 and the base plate are secured together preferably by welding in the manner disclosed in my copending application Serial No. 653,912 filed January 27, 1933, the insulation disc 24 being interposed between the base plate and the wall 21 for localization of the electric welding current at the edge of the frame member 11 for welding thereof to the base plate. After the welding operation the wall or disc 21 will be intimately and securely clamped and held against the edge of the inner frame member 10.

The piston structure comprises the cylindrical enlargement or piston hub 19' at the inner end of the shaft 19 and the piston vane 27 having the recess 26 receiving the wing 25 extending from the hub, the outer surface of the piston vane being cylindrical to fit and bear against the inner cylindrical surface of the cup frame 10, a spring 28 exerting outward radial pressure against the piston vane to hold it in such bearing engagement. The shaft 19 at its outer end is engaged by a lever 29 which is connected by a suitable link structure 30, usually with the axle X of the vehicle, as shown in Figure 1. Upon relative movement between the vehicle body and axle the shaft 19 and piston hub 19' will be oscillated and the piston vane 27 will be swung back and forth within the structure 10.

In the bottom of the frame 10 is seated the abutment or partition element 31 which extends between the cylinder wall of the frame and the piston hub 19', the recess 32 in the upper side of the member 31 intimately receiving the piston hub to form a bearing therefor. In its outer side the member 31 has the notch 33 receiving the abutment plate 34 secured to the cylinder wall of the frame 10, preferably by welding, this abutment plate holding the member 31 against lateral movement and the walls 12 and 21 engaged by the front and rear side of the member 31 holding it against axial displacement.

The stationary partition member 31, together with the piston structure divide the space within the frame 10 into hydraulic working chambers A and B. As the shaft and piston structure are oscillated the fluid is displaced in the working chambers and improved valving arrangement is provided for controlling the flow from one chamber to the other. The partition member 31 has the longitudinally extending cylindrical valve chamber 35 in which the spool shaped valve 36 fits and is reciprocable, the movement of the valve in one direction being resisted by a spring 37 and the movement in the opposite direction being resisted by the spring 38. The springs are of equal tension so that normally the annular port 39 of the valve is in registration with the cross-passage 40 in the partition member. At one side of the valve the cross-passage 40 is connected by the longitudinal passage 41 with the working chamber A, while the longitudinal passage 42 at the opposite side of the valve connects the cross-passage with the chamber B. The cross-passage 40 is closed at the front and the rear by the walls 12 and 21 respectively and when the valve is in its normal or neutral position the chambers A and B are in communication for the interflow of fluid through the path including the cross-passage, the longitudinal passages and the valve port 39. These passages are of restricted diameter for the desired resistance to flow through such path.

Extending upwardly from the valve chamber 35 at opposite sides of the valve 36 are ports 43 and 43' which terminate at the recess 32 in the member 31. On its side directly opposite the piston vane 27 the piston hub 19' has a port 44 milled therein and extending in chordal direction, while at the opposite sides of the piston hub and displaced from the port 44 are the side ports 45 and 45' milled in the hub and also extending in chordal direction. In the normal or static position of the shock absorber parts, as shown in Figure 3, the piston vane 27 is at the upper part of the housing 10 midway between the working chambers A and B, and the bottom port 44 is within the recess 32 and spans the ports 43 and 43' so that the pressure in the valve chamber at opposite sides of the valve will be equalized and the valve will be in its central position with the path defined by the passages 40, 41 and 42 open. This path will remain open during initial oscillatory movement of the shaft and piston structure and so long as the ports 43 and 43' are open. Upon further oscillation of the shaft the advancing end of either the port 45 or 45' will pass beyond the respective port 43 and 43' for the flow of fluid under pressure into the corresponding end of the valve chamber for shift of the valve to disconnect its port 39 from the cross-port 40 and to close this cross-passage to check the further flow of fluid through the path which includes the passages 40, 41 and 42. Figure 7 shows the shaft and piston structure moved in counter-clockwise direction to bring the port 45 in communication with the port 43 so that fluid under pressure then flows from the chamber A through the ports 45 and 43 and into the valve chamber at the left of the valve, the valve being then shifted toward the right against the resistance of the spring 38 for interposition of the valve body in the cross port 40 to cause closure of the path 40, 41, 42 so that pressure will be built up in the chamber A to check further movement of the piston structure. If the piston structure is moved from normal position in the opposite direction (clockwise) then the side port 45' will register with the port 43' and the valve will be shifted toward the left for closure of the fluid flow path and building up of pressure in the chamber B for checking further movement of the piston structure.

The space 46 between the walls 12 and 13 of the housing members 10 and 11 provides a fluid reserve reservoir 46 which can be filled through an opening 47 closed by a plug 48. I provide valve structure for controlling the flow of replenishing fluid to the working chambers A and B, and also valve means for relieving the ends of the valve chamber. Preferably a single valve chamber is provided for two valving means. As best shown in Figures 5 and 6 the partition member 31 has the valve chambers 49 and 49' therein below the left and right ends respectively of the valve chamber 35. The valve chamber 49 is connected by a laterally extending port 50 with the working chamber A, while the port or passage 50' extends from the valve chamber 49' to the working chamber B. The inner end of each valve chamber is conical to form a seat for a check valve in the form of a ball 51, the valve chamber 49 at its inner end being connected by the lateral passage 52 which communicates with the vertical passage 53 extending up to the left end of the valve chamber 35. Similarly the valve chamber 50' at its inner end connects with the lateral passage 52' which communicates with the vertical passage 53' leading to the right end of the valve chamber 35. Fluid may therefore flow from the left end of the valve chamber 35 thru the passages 53 and 52 and past the check valve 51 into valve chamber 49 and from there through the lateral passage 50 to the working chamber A. Similarly fluid may flow from the right end of the valve chamber 35 past the ball check 52' to valve chamber 49' and from there through passage 50' to the working chamber B. The flow from the working chamber to the valve chamber 35 will be prevented by the seating of the ball 51.

In the outer end of each of the valve chambers 49 and 49' a seat plug 54 is inserted for seating a ball check valve 55. Each of the valve chambers 49 and 49' is in registration at its outer end with a passage 56 through the wall 12 of the housing member 10, these passages 56 communicating with the reserve reservoir 46. Fluid may flow from the reservoir through the passages 56 past the check valves 55 into the respective valve chambers 49 and 49' and from there through the passages 50 or 50' to the working chambers A or B, fluid being drawn into the working chambers in the wake of the piston, flow in the opposite direction being prevented by the check balls 55.

Any fluid which may be forced out from the working chamber between the outer end of the shaft 19 and the bearing member 14 is intercepted by a circumferential channel 57 in the shaft which communicates with passages 58 connecting with the reservoir 46. A sheet metal cap 59 is press fitted over the outer end of the frame member 11 and serves to compress packing material 60 between the shaft and the outer end of the bearing member 14 so as to prevent leakage to the exterior of the shock absorber of any fluid which may flow past the channel 57.

Briefly summarizing the operation, the static or normal position of the shock absorber parts is as shown in Figure 3, the valve 36 being in its central or neutral position for opening of the paths 40, 41 and 42. As the vehicle travels over the ordinary imperfections in a roadway, the piston structure oscillation amplitude will be comparatively short and the ports 43 and 43' will remain disconnected from the working chambers so that the fluid may flow back and forth between working chambers through the open passage controlled by the valve 36 against the friction to flow through the passageways and the abrupt turning of the flow on its way through the passages 41, 40 and 42. Should an extraordinary bump in the roadway cause the axle to be raised for swing of the piston structure far enough to uncover both the ports 43 and 43' then the valve 36 will be shifted to close the passage through the partition 31. Figure 7 illustrates such movement of the axle, the piston structure being swung correspondingly counter-clockwise for communication of the side port 45 with the port 43. The ports in the piston hub are of varying depth so that the connection of the port 45 with the port 43 will be gradual for gradual building up of pressure in the left end of the valve chamber 35 and gradual shift of the valve toward the right for gradual closure of the passage through the partition 31. After complete closure of the passage by the valve 36 the resistance pressure built up in the working chamber A will check further movement of the piston structure and further compression of the spring will be prevented just before bottoming takes place. During flow of fluid under pressure into the left end of the valve chamber 35 the fluid may flow from the right end of the valve chamber through the port 43' into the working chamber B.

After such compression of the spring, should the spring tend to rebound, the piston structure will be rapidly swung in the opposite direction (clockwise) and fluid will be forced from the working chamber B through the port 43' into the right end of the valve chamber 35 to cause the valve to be rapidly shifted to the left for closure of the passage through the partition 31 and checking of the rebound stroke. The pressure subjected fluid in the working chamber B must then force its way to the working chamber A by way of the calculated working clearances or tolerances between the frame and moving parts of the shock absorber until the port 44 in the piston hub again comes into the recess 32 for spanning of the port 43, 43' and relief of pressure from the valve chamber 35 for return of the valve to its neutral position for opening of the passage through the partition 31 so that the final rebound movement is taken up by the resistance of such passage.

Should the vehicle wheel encounter a depression and the axle suddenly move downwardly, the piston structure will be swung in clockwise direction first against the resistance through the path 40, 41, 42 in the partition member, and, if the amplitude is great enough for opening of the port 43' to the side port 45' in the piston hub, and consequent closure of the valve 36, the pressure built up in the chamber B will check further movement of the axle and resist the shock thereof. As the spring tends to follow up the movement of the axle, the piston structure will be swung in the opposite direction (counter-clockwise) and the fluid from chamber A, driven through the port 44 and port 43 to the left end of the valve chamber 35, will cause shift of the valve to close the passage through the partition 31, and the pressure built up in the chamber A will check such rebound until the port 44 again spans the port 43, 43' for neutralization of pressure in the valve chamber 35 and reopening of the passage through the partition 31 whereafter the resistance through said passage will check the final movement of the spring.

During operation of the valve 36, oil locks in the ends of the valve chamber will be prevented by the release of the fluid into the respective check valve chambers 49 and 49' and to the corresponding working chamber. During oscillation of the piston structure fluid will flow from the replenishing chamber 46 through the passages 56 into the working chambers in the wake of the travelling piston structure.

I have shown a practical and efficient embodiment of the various features of my invention but I do not desire to be limited to the exact construction, arrangement and operation shown and described as changes and modifications may be made without departing from the scope and spirit of the invention.

I claim as follows:

1. A hydraulic shock absorber comprising a housing for hydraulic fluid, a partition member in said housing, a piston structure oscillatable in said housing, said piston structure and partition member dividing said housing into working chambers, said partition member having a passage therethrough for flow of fluid between said working chambers, a valve chamber included in said passage, a valve movable in said valve chamber normally positioned to open said passage, ports leading from said valve chamber at opposite sides of said valve, and means adapting said piston structure to operate as a valve for connecting said valve chamber ports with the working chambers for flow of fluid under pressure to said valve chamber for shifting said valve for closure of said passageway after a predetermined distance of movement of said piston structure.

2. A hydraulic shock absorber comprising a housing for hydraulic fluid, a partition element in said housing, a piston structure oscillatable in said housing, said piston structure dividing said housing into two working chambers, said partition element having a passageway therethrough for the flow of fluid between said working chambers, a valve chamber in said passageway, a valve shiftable in said valve chamber, yielding means tending to hold said valve in neutral position for opening of said passageway, ports leading from said valve chamber at opposite sides of said valve, said piston structure having ports arranged to span said valve chamber ports for equalization of pressure in said valve chamber when said piston structure is in neutral position and to connect said valve chamber ports with said working chambers for flow of fluid under pressure into said valve chamber at one side of said valve when said piston structure is moved a predetermined distance, whereby said valve will be shifted for closure of said passageway against fluid flow and resultant checking of further movement of said piston structure.

3. In a hydraulic shock absorber, a housing providing a hydraulic working chamber, a piston structure for displacing fluid in said chamber, means providing a discharge passageway for said working chamber, a valve controlling said passageway, a valve chamber for said valve, means forming a chamber for replenishing fluid for said working chamber, a check valve chamber connected with said working chamber, a connection from said check valve chamber to said replenishing chamber and a connection from said check valve chamber to said first mentioned valve chamber, and check valves in said check valve chamber operable to prevent flow of fluid from said check valve chamber to said replenishing chamber or said first mentioned valve chamber.

4. A hydraulic shock absorber comprising a housing for hydraulic fluid, a piston structure oscillatable in said housing to displace the fluid therein, means providing a passage for the flow of fluid from one side of the piston structure to the other, a valve chamber included in said passage, a valve movable in said valve chamber and normally positioned to open said passage, ports leading from said valve chamber at opposite sides of said valve, and means adapting said piston structure to operate as a valve for connecting said ports for flow of displaced fluid under pressure to cause said valve chamber to act as lifting for said valve to close or close said passage after a predetermined distance of movement of said piston structure.

said passage, ports leading from said valve chamber at opposite sides of said valve, said piston structure having side ports and an intermediate port, said intermediate port arranged to span said valve chamber ports when said piston structure is in a normal position, and said side ports functioning upon movement of said piston structure in either direction from normal position to expose one of said valve chamber ports to said hydraulic working chamber in advance of the moving piston structure and the other valve chamber port to the working chamber in the wake of the piston structure whereby said valve will be shifted to close said passage against further fluid flow therethrough.

8. A hydraulic shock absorber comprising a housing providing a hydraulic working chamber, a piston structure movable in said chamber to displace the fluid therein, means providing a passage for the flow of fluid from one side of the piston structure to the other, a valve chamber included in said passage, a valve movable in said valve chamber and normally positioned to open said passage, ports leading from said valve chamber at opposite sides of said valve, said piston structure being disposed at opposite sides of said valve, said piston structure having a means for connecting said valve chamber ports with said working chamber to cause opposite sides of said piston structure to be placed in direct communication with said valve chamber whereby said valve will be shifted to close said passage.

9. A hydraulic shock absorber comprising a housing providing a hydraulic working chamber, a piston structure movable in said chamber to displace the fluid therein, means providing a passage for the flow of fluid from one side of the piston structure to the other, a valve chamber included in said passage, a valve movable in said valve chamber and normally positioned to open said passage, ports leading from said valve chamber at opposite sides of said valve, said piston structure being provided with means for communicating said valve chamber ports with said working chamber respectively with said working chamber upon movement of said piston structure a predetermined distance whereby said valve chamber is exposed to fluid flow and said valve to close said passage.

10. A hydraulic shock absorber, comprising providing a hydraulic working chamber, a piston structure to displace fluid in said chamber, means providing a passage way in said working chamber, a valve chamber included in said passage way and a valve in said valve chamber, means forming a chamber for replenishing fluid of said working chamber, a valve for preventing flow of fluid from said working chamber and preventing flow of fluid from said replenishing chamber into said working chamber, and preventing flow of fluid from said working chamber into said valve chamber, and a common valve chamber for said three valves.

ARCHIBALD B. WILLIAMS.